(12) United States Patent
Lorca Hernando

(10) Patent No.: US 9,276,648 B2
(45) Date of Patent: Mar. 1, 2016

(54) METHOD AND SYSTEM FOR PERFORMING MULTIPLE ACCESS IN WIRELESS OFDM CELLULAR SYSTEMS CONSIDERING BOTH SPACE AND FREQUENCY DOMAINS

(71) Applicant: TELEFONICA, S.A., Madrid (ES)

(72) Inventor: Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 38 days.

(21) Appl. No.: 14/282,227

(22) Filed: May 20, 2014

(65) Prior Publication Data

US 2014/0348255 A1    Nov. 27, 2014

(30) Foreign Application Priority Data

May 21, 2013   (EP) .................................... 13382186

(51) Int. Cl.

| | |
|---|---|
| H04W 4/00 | (2009.01) |
| H04L 1/02 | (2006.01) |
| H04L 27/02 | (2006.01) |
| H04B 7/02 | (2006.01) |
| H04B 7/04 | (2006.01) |
| H04B 7/06 | (2006.01) |
| H04L 5/00 | (2006.01) |
| H04L 27/26 | (2006.01) |
| H01Q 1/24 | (2006.01) |
| H01Q 21/06 | (2006.01) |

(52) U.S. Cl.
CPC ............. *H04B 7/0413* (2013.01); *H01Q 1/246* (2013.01); *H01Q 21/061* (2013.01); *H04B 7/0452* (2013.01); *H04B 7/0617* (2013.01); *H04L 5/0003* (2013.01); *H04L 27/2601* (2013.01)

(58) Field of Classification Search
None
See application file for complete search history.

(56) References Cited

U.S. PATENT DOCUMENTS

| | | | | |
|---|---|---|---|---|
| 2003/0095533 | A1* | 5/2003 | Joo et al. ........................ | 370/343 |
| 2004/0042439 | A1* | 3/2004 | Menon et al. .................. | 370/343 |
| 2011/0129031 | A1* | 6/2011 | van de Beek et al. .......... | 375/295 |
| 2013/0129008 | A1* | 5/2013 | Ko et al. ......................... | 375/295 |
| 2014/0341048 | A1* | 11/2014 | Sajadieh et al. ............... | 370/252 |
| 2015/0124688 | A1* | 5/2015 | Xu et al. ......................... | 370/312 |

* cited by examiner

*Primary Examiner* — Chi H Pham
*Assistant Examiner* — Soon-Dong D Hyun
(74) *Attorney, Agent, or Firm* — Sughrue Mion, PLLC

(57) ABSTRACT

The method comprising a base station equipped with a large number of antennas according to a two-dimensional rectangular array and a number M of cell users, said rectangular array comprising $N_1$ antenna elements along one axis with a regular spacing $d_x$ and $N_2$ antenna elements along a perpendicular axis with a regular spacing $d_y$, said users being characterized by angles $(\theta,\phi)$ in a spherical coordinate system, where in order to achieve orthogonal multiple access the method comprises: selecting a grid spacing $(\Delta u, \Delta v)$ in the (u, v) domain; discretizing the (u, v) domain; constructing a set of signals $S_T[k,l,f]$; calculating time-domain excitations $A_T[n,m,t]$ for the antenna elements in the array given by coordinates $(nd_x, md_y)$ for generation of the downlink transmit signals; and obtaining the frequency contents $S_R[k,l,f]$ of the complex baseband signals received from the M users in the uplink.
The system implements the method of the invention.

11 Claims, 8 Drawing Sheets

METHOD AND SYSTEM FOR PERFORMING MULTIPLE ACCESS IN WIRELESS OFDM CELLULAR SYSTEMS CONSIDERING BOTH SPACE AND FREQUENCY DOMAINS

FIELD OF THE ART

The present invention generally relates to the field of multi-antenna technology in wireless cellular systems, and more particularly to a method and system for performing multiple access in wireless OFDM cellular systems considering both space and frequency domains.

PRIOR STATE OF THE ART

Long-Term Evolution (LTE) is the next step in cellular 3G systems, which represents basically an evolution of the actual mobile communications standards, such as UMTS and GSM [1]. It is a 3GPP standard that provides throughputs up to 50 Mbps in uplink and up to 100 Mbps in downlink. It uses scalable bandwidth from 1.4 to 20 MHz in order to suit the needs of network operators that have different bandwidth allocations. LTE is also expected to improve spectral efficiency in networks, allowing carriers to provide more data and voice services over a given bandwidth.

LTE-Advanced (LTE-A), an evolution of LTE, is being standardized in LTE Release 10 and beyond. It is aimed at fulfilling IMT-Advanced requirements, whose capabilities go beyond those of IMT-2000 and include enhanced peak data rates to support advanced services and applications (100 Mbps for high mobility, and 1 Gbps for low mobility) [2].

The use of multiple antenna technology (commonly known as MIMO) allows the exploitation of the spatial domain as another new dimension. This becomes essential in the quest for higher spectral efficiencies. Multiple antennas can be used in a variety of ways, mainly based on three fundamental principles [3]:

Diversity gain. Use of the space-diversity provided by the multiple antennas to improve the robustness of the transmission against multipath fading.

Array gain. Concentration of energy in one or more given directions via precoding or beamforming.

Spatial multiplexing gain. Transmission of multiple signal streams to a single or multiple users on multiple spatial layers created by combinations of the available antennas.

These three principles are actually inter-related and one can expect array gains in addition to spatial multiplexing gains in particular MIMO techniques. Especially when dealing with multi-user MIMO, where multiple users are served in the same time-frequency resources by a combination of multiple spatial streams, users can benefit from the array gain achieved through beamforming for spatial separation of the multiple beams addressed for the different users.

So far, LTE-Advanced foresees the use of up to eight transmit antennas at the base stations. In order to address huge increases in the average cell spectral efficiency, massive MIMO systems are currently being investigated as future extensions of LTE-Advanced beyond Release 12 [5]. These systems comprise several hundreds of low-power antennas, where the degrees of freedom in excess allow for a variety of signal processing possibilities in transmission and reception. These large MIMO systems are currently subject to intense research.

Some solutions are aimed at increasing spatial focusing of energy into specific directions, therefore addressing users more sharply [8]. So-called Time Reversal Beamforming (TRBF) focuses electromagnetic energy by means of probing the channel and time-reversing the received signals as it is proposed in U.S. Pat. No. 8,330,642. Other more traditional beamforming solutions involve tailoring the radiated pattern, so that beams oriented towards different users present minimum overlapping in order to minimize inter-user interference.

Current solutions in LTE-Advanced do foresee combinations of beamforming and spatial multiplexing for simultaneously addressing multiple users with different beamformers, based on proprietary precoding techniques [3]. However the limited number of antennas (maximum eight) precludes addressing more than eight single-layer users in the same time-frequency resources. Massive MIMO systems cannot therefore exploit any extra antennas for simultaneously serving a higher number of users.

Moreover, traditional beamforming approaches based on directing the radiated antenna pattern towards the intended users do not enable fully orthogonal separation of resources in space, as the beams will in general overlap to some extent. In order to limit the beams' side lobes (which are responsible for the interference), a large subset of the antenna array must be dedicated to each user. This dramatically reduces the maximum number of users that can be simultaneously served with a given number of antennas.

Other techniques, such as the one proposed by patent application US 2013/0028341 rely upon a precoding transmission matrix based on Singular Value Decomposition (SVD) of the channels. These techniques require significant feedback from the terminals in Frequency Division Duplex (FDD) systems, in order to select the best precoding matrix (or matrix index). The amount of feedback required may become impractical with a large number of antennas and users, as at least one feedback channel will be present per each of the users and antennas. This major drawback may preclude these schemes from operating in FDD mode.

TRBF techniques suffer the drawback of requiring a two-steps procedure comprising a probe mechanism followed by a time-reversal signal generation, thus requiring computationally expensive time-domain processing. Given the short time intervals currently present in modern cellular systems (as in LTE, with scheduling intervals of only 1 ms), beamforming procedures should not involve costly operations in time and processing power.

There is a general need for providing more advanced solutions for achieving orthogonal multi-user multiplexing in massive MIMO systems with large antenna arrays at the base stations.

SUMMARY OF THE INVENTION

An object of the present invention is to provide a new mechanism to achieve orthogonal multiplexing of users in space and frequency domains through three-dimensional Discrete Fourier Transforms (DFT), by using large antenna arrays at the base stations and by proposing an orthogonal space-frequency multiplexing technique, such that it is possible to address as many users as antennas are at the base station without suffering from undesired inter-user interference.

To that end, according to a first aspect, there is provided a method for performing multiple access in wireless OFDM cellular systems considering both space and frequency domains, comprising at least one base station equipped with a large number of antennas according to a two-dimensional rectangular array and a number M of cell users, said rectangular array comprising $N_1$ antenna elements along one axis with a regular spacing $d_x$ and $N_2$ antenna elements along a perpendicular axis with a regular spacing $d_y$, said cell users being characterized by angles $(\theta,\phi)$ in a spherical coordinate system.

On contrary to the known solutions, and in order to achieve orthogonal multiple access the method of the first aspect comprises using an orthogonal space-frequency processing unit for:

selecting a grid spacing $(\Delta u, \Delta v)$ in the (u, v) domain through the equations:

$$\Delta u = \frac{\lambda}{N_1 d_x},$$
$$\Delta v = \frac{\lambda}{N_2 d_y}$$

where $\lambda$ denotes the wavelength of the system operating frequency, and the (u, v) domain is obtained from the following transformation of the spherical angles $(\theta,\phi)$:

$$u = \sin(\theta)\cos(\phi)$$

$$v = \sin(\theta)\sin(\phi);$$

discretizing the (u, v) domain according to the following expressions:

$$u_k = k \cdot \Delta u, k = 0, 1, \ldots, N_1 - 1$$

$$v_l = l \cdot \Delta v, l = 0, 1, \ldots, N_2 - 1,$$

where the visible region of the grid corresponds to those values enclosed within a unit circle according to the equation:

$$u^2 + v^2 \leq 1;$$

constructing a set of signals $S_T[k,l,f]$ according to the following expression:

$$S_T[k, l, f] = \begin{cases} S_i[f]; \forall (k, l) = \{(k_i, l_i), i = 0, 1, \ldots, M-1\} \\ 0; \text{otherwise,} \end{cases}$$

where $S_i[f]$ denote the frequency contents of the complex baseband signal aimed at user i, and $(k_i, l_i)$ represent the estimated user locations in the discretized (u, v) grid;

calculating the time-domain excitations $A_T[n,m,t]$ for the antenna elements in the array given by coordinates ($nd_x$, $md_y$), for generation of the downlink transmit signals according to the following expression:

$$A_T[n, m, t] = \frac{1}{N_c N_1 N_2}$$

$$\sum_{f=0}^{N_c-1} \sum_{k=0}^{N_1-1} \sum_{l=0}^{N_2-1} S_T[k, l, f] \exp\left(j\frac{2\pi}{N_c}ft\right) \exp\left(-j\frac{2\pi}{N_1}nk\right) \exp\left(-j\frac{2\pi}{N_2}ml\right),$$

where $N_c$ denotes the number of subcarriers in the system bandwidth; and obtaining the frequency contents $S_R[k,l,f]$ of the complex baseband signals received from the M users in the uplink, by applying the following transformation over a set of received signals $A_R[n,m,t]$ corresponding to each of the antenna elements:

$$S_R[k, l, f] =$$

$$\sum_{t=0}^{N_c-1} \sum_{n=0}^{N_1-1} \sum_{m=0}^{N_2-1} A_R[n, m, t] \exp\left(-j\frac{2\pi}{N_c}ft\right) \exp\left(j\frac{2\pi}{N_1}nk\right) \exp\left(j\frac{2\pi}{N_2}ml\right).$$

In order to minimize the interferences between the user's beams, a scheduling strategy comprising assigning unused space and/or frequency resources to each one of the M cell users is performed by a combined space-frequency scheduler unit. According to some embodiments, preferably four different alternatives for performing said scheduling strategy can be carried out.

According to an alternative, the scheduling strategy can be performed by assigning orthogonal time-frequency resources to beams which are close to each other to avoid said interferences between the users' beams.

According to another alternative, the scheduling strategy can be performed by reserving guard beams in the (u, v) domain at some of the grid points between the cell coordinates of two or more cell users, in order to keep said interferences between the users' beams to a minimum.

According to yet another alternative, the scheduling strategy can be performed by assigning the same transmit signal to a plurality of grid points enclosing the cell user coordinates in the (u, v) domain and a number of guard beams for reduced interference in order to account inaccuracies when estimating the cell users' spherical angles $(\theta,\phi)$ Finally, according to yet another alternative, the scheduling strategy can be performed by modifying the shape of the beam reconstruction functions by applying a windowing technique to the excitation coefficients in order to control the beams' decay rate and hence alleviate interference between the users' beams.

According to an embodiment, the resolution of the grid in the (u, v) domain can be dynamically adjusted, by a grid resolution unit, so as to maximize the illumination, by considering only a subset of active antenna elements in the array. In this case, the spacing between antenna elements is maintained and the angular coverage of the antenna array is also kept.

According to a second aspect there is provided a system for performing multiple access in wireless OFDM cellular systems considering both space and frequency domains, comprising at least one base station equipped with a large number of antennas according to a two-dimensional rectangular array and a number M of cell users, said rectangular array comprising $N_1$ antenna elements along one axis with a regular spacing $d_x$ and $N_2$ antenna elements along a perpendicular axis with a regular spacing $d_y$, said cell users being characterized by suitable angles $(\theta,\phi)$ in a spherical coordinate system.

On contrary to the known proposals, the system of the second aspect comprises an orthogonal space-frequency processing unit to achieve orthogonal multiple access comprising:

selecting a grid spacing $(\Delta u, \Delta v)$ in the (u, v) domain through the equations:

$$\Delta u = \frac{\lambda}{N_1 d_x},$$
$$\Delta v = \frac{\lambda}{N_2 d_y},$$

where λ denotes the wavelength of the system operating frequency, and the (u, v) domain is obtained from the following transformation of the spherical angles (θ,φ):

$$u = \sin(\theta)\cos(\phi)$$

$$v = \sin(\theta)\sin(\phi);$$

discretizing the (u, v) domain according to the following expressions:

$$u_k = k \cdot \Delta u, k = 0, 1, \ldots, N_1 - 1$$

$$v_l = l \cdot \Delta v, l = 0, 1, \ldots, N_2 - 1,$$

where the visible region of the grid corresponds to those values enclosed within a unit circle according to the equation:

$$u^2 + v^2 \leq 1;$$

constructing a set of signals $S_T[k,l,f]$ according to the following expression:

$$S_T[k, l, f] = \begin{cases} S_i[f]; \forall (k, l) = \{(k_i, l_i), i = 0, 1, \ldots, M-1\} \\ 0; \text{otherwise} \end{cases},$$

where $S_i[f]$ denote the frequency contents of the complex baseband signal aimed at user i, and $(k_i,l_i)$ represent the estimated user locations in the discretized (u, v) grid;

calculating the time-domain excitations $A_T[n,m,t]$ for the antenna elements in the array given by coordinates $(nd_x, md_y)$, for generation of the downlink transmit signals according to the following expression:

$$A_T[n, m, t] = \frac{1}{N_c N_1 N_2}$$

$$\sum_{f=0}^{N_c-1} \sum_{k=0}^{N_1-1} \sum_{l=0}^{N_2-1} S_T[k, l, f] \exp\left(j\frac{2\pi}{N_c} ft\right) \exp\left(-j\frac{2\pi}{N_1} nk\right) \exp\left(-j\frac{2\pi}{N_2} ml\right),$$

where $N_c$ denotes the number of subcarriers in the system bandwidth; and obtaining the frequency contents $S_R[k,l,f]$ of the complex baseband signals received from the M users in the uplink, by applying the following transformation over a set of received signals $A_R[n,m,t]$ corresponding to each of the antenna elements:

$$S_R[k, l, f] =$$

$$\sum_{t=0}^{N_c-1} \sum_{n=0}^{N_1-1} \sum_{m=0}^{N_2-1} A_R[n, m, t] \exp\left(-j\frac{2\pi}{N_c} ft\right) \exp\left(j\frac{2\pi}{N_1} nk\right) \exp\left(j\frac{2\pi}{N_2} ml\right).$$

The system of the second aspect, according to an embodiment, comprises a combined space-frequency scheduler unit to perform space-frequency resource allocation strategies for each one of the M cell users. In addition, an angle detection unit related to said combined space-frequency scheduler unit is prepared for analyzing the signals received from said two-dimensional rectangular array in order to estimate the angles of arrival of said received signals.

Finally, the system further comprises a grid resolution unit to adjust the resolution of the grid in the (u, v) domain according to a desired resolution angle by considering only a subset of active antenna elements in the array, in order to ensure orthogonality of a plurality of beams while maintaining the spacing between antenna elements and the angular coverage of the antenna array.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF THE INVENTION

Figure 1:
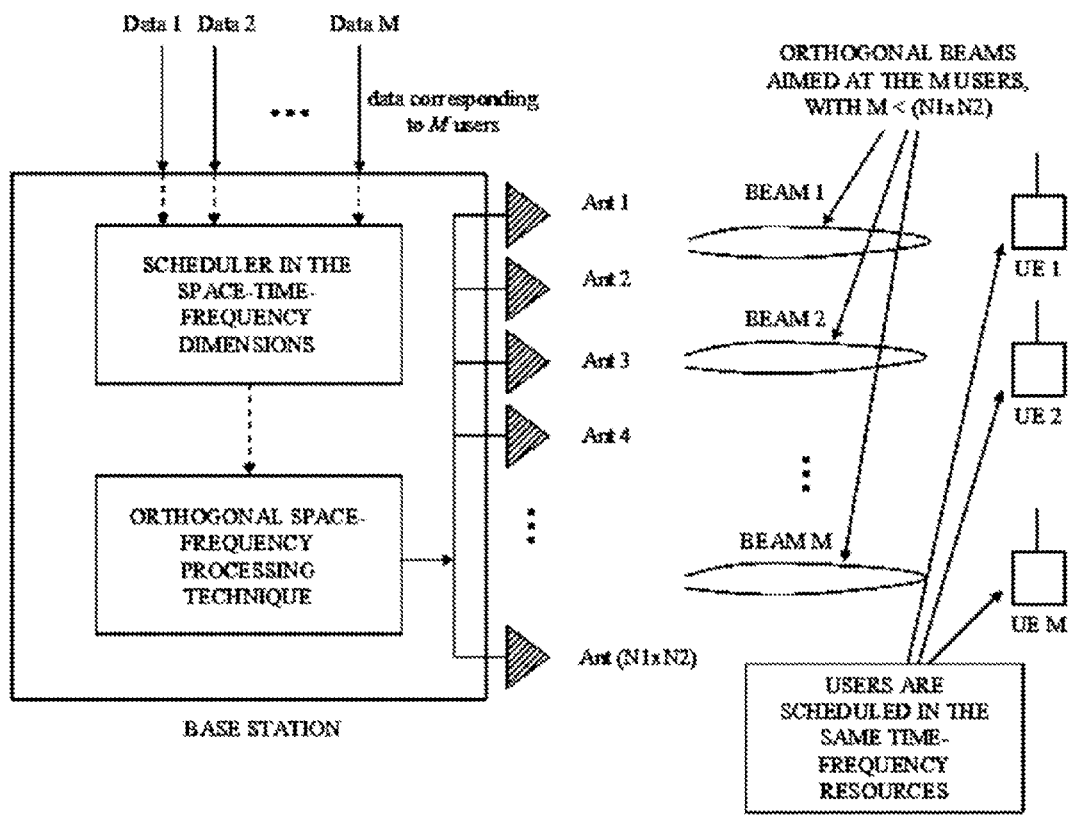
FIG. 1 is an illustration showing the proposed mechanism according to an aspect of the present invention.

FIG. 1 illustrates the proposed idea of the present invention according to an aspect. A base station comprising a large number of antennas (in the form of a two-dimensional array) is aimed at transmitting a given number of signals to a set of M users, so that each user receives its intended signal (or set of intended signals) without interference to/from the other users. To do so, the proposed technique achieves orthogonality of the received beams at specific directions in space given by the angles (θ,φ) in a spherical coordinate system. Instead of physically steering the beams towards certain directions, as is classically done by antenna arrays, the present invention is capable of generating a combined field with the fundamental property that no inter-user interference is ideally present, provided that the users preferably are located at known sampling points in a space grid. A combined space-time-frequency scheduler can allocate resources in the three orthogonal dimensions, and a unit providing a proposed orthogonal space-frequency processing technique provides the required excitations in downlink to a number of antennas at each time instant. Similarly, this technique can achieve orthogonal separation of users in uplink.

A combined space-frequency orthogonal multiplexing technique generates a set of excitation amplitudes to the antenna elements in the array, with the property that all the radiated signals from the antennas are combined in such a way that each user receives the desired signals with ideally no interference from the other users. Similarly, an inverse space-frequency processing technique achieves orthogonal separation of users in the uplink so that they can be scheduled the same time-frequency resources.

Traditional beamforming techniques employ a given number of antennas in order to shape the desired radiation pattern intended for each user. The number of users than can be simultaneously served is thus limited by the fraction of the total number of antennas that each user requires for beamforming purposes. Inter-user interference will appear unless very sharp beams are generated, and this usually involves a large number of antennas per user therefore limiting the maximum number of simultaneous users to be addressed.

On contrary to prior art techniques, this invention proposes a new technique capable of addressing as many users in the cell as antennas are in the base station, given that they are located at defined sampling points in a space grid. The attainable spectrum efficiency is therefore the maximum possible with a given number of antennas, as no other technique can yield higher spectrum efficiency per unit area. The proposed processing technique can be performed very efficiently through use of three-dimensional Fast Fourier Transforms (FFTs). Moreover, combined space-frequency resource allocation strategies can be integrated into the base station scheduler, therefore maximizing the cell spectrum efficiency per unit area.

Strategies are also devised for dealing with inaccuracies in the estimation of the users' angles, which would result in significant inter-user interference. Additionally, the sampling grid can be dynamically adjusted through selection of a subset of the active antenna elements in the array, therefore varying the beam width and resolution according to the interests in each scenario. Moving users can be better served with a lower space resolution than users in static conditions, and the system can dynamically adapt to the general situation in the cell.

Figure 2:
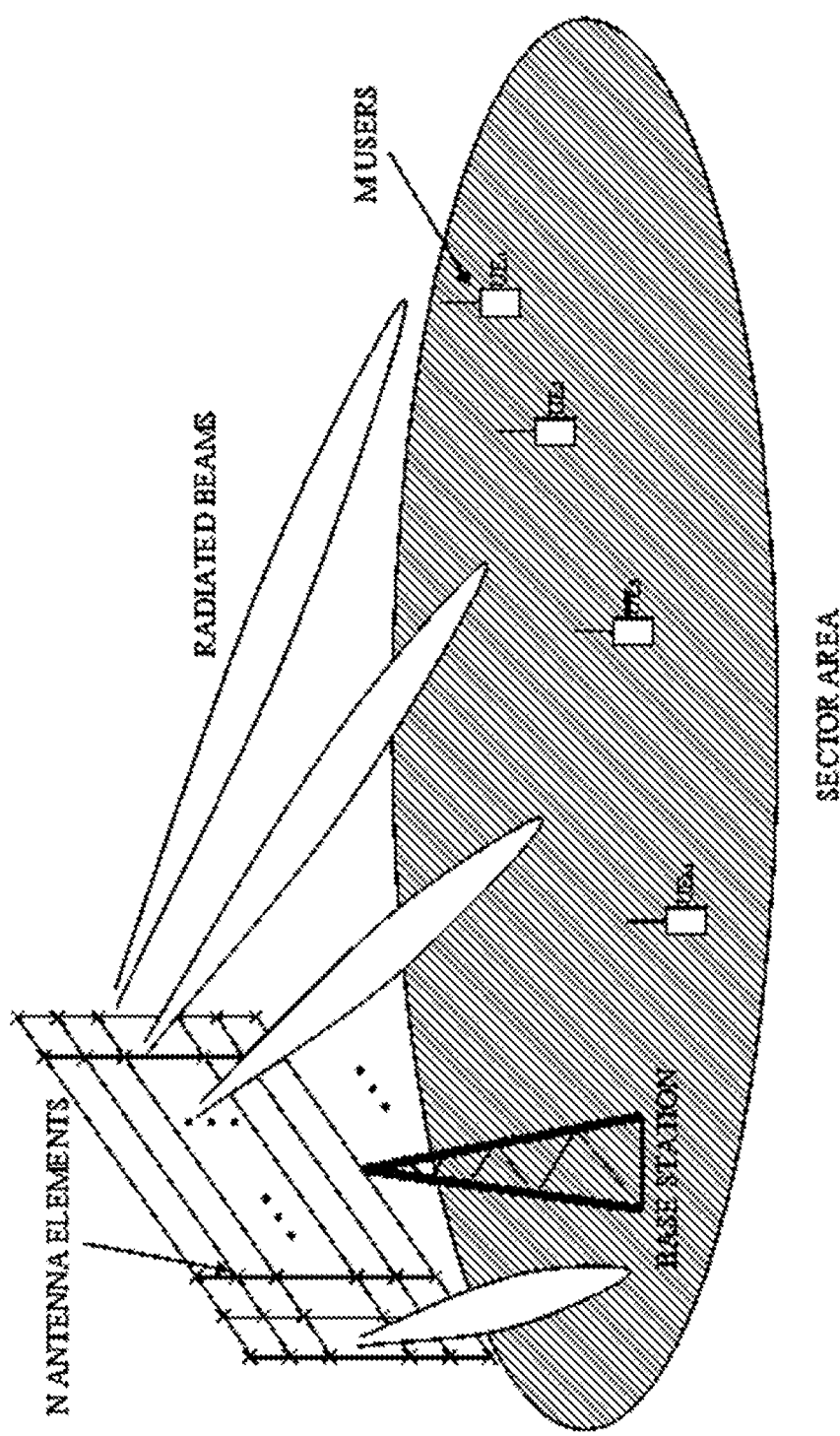
FIG. 2 is an illustration of a possible scenario where the present invention can be applied.

FIG. 2 illustrates the scenario for the proposed invention. A cell site in a wireless cellular system comprises a base station equipped with a large number of identical transmit antennas, in the form of a two-dimensional antenna array with N antenna elements, and M users (each having a single antenna) willing to simultaneously transmit/receive at certain time-frequency resources allocated by the base station. In what follows it is assumed that Orthogonal Frequency-Division Multiplexing (OFDM) is employed for the allocation of users in time and frequency, as happens in wireless technologies like LTE, LTE-Advanced or WiMAX.

Preferably, it will be assumed that the users are in static or very low-mobility conditions. It will also be assumed that significant direct vision is present between the users and the base station, so that the latter can obtain the angles of departure/arrival corresponding to the signals to/from the different users. These angles can be estimated in different ways through appropriate processing of uplink signals coming from the users, by exploiting the long-term reciprocity characteristics of uplink and downlink. Long-term channel reciprocity can be exploited in both Time Division Duplex (TDD) and Frequency Division Duplex (FDD) systems. The Angle of Arrival (AOA) in uplink is equal to the Angle of Departure (AOD) in downlink even in FDD, as angles are mostly dictated by the physical environment and the scatterers [9]. Thus, the AOA can be estimated through uplink sounding and used later as a measure of AOD.

An aim of the present invention is to address the desired number of users by employing the minimum set of time-frequency resources, through appropriate excitation of the transmit antennas at the base station. Contrary to traditional beamforming techniques, where different spatial beams are independently generated so as to favour specific directions in space, the present invention proposes a space-frequency signal processing technique whereby the combined reception of the signals coming from all the transmit antennas will yield the desired results at particular points in space. Rather than generating independent beams in several directions, a combined field pattern will yield the desired signals when sampled at the particular directions in space where the users are supposed to be located.

It is to note that the users may have more than one receive antenna for increased receive diversity, but for the purpose of the present invention this will be equivalent to a single-antenna scenario as additional receive antennas will be transparent to the system.

Figure 3:
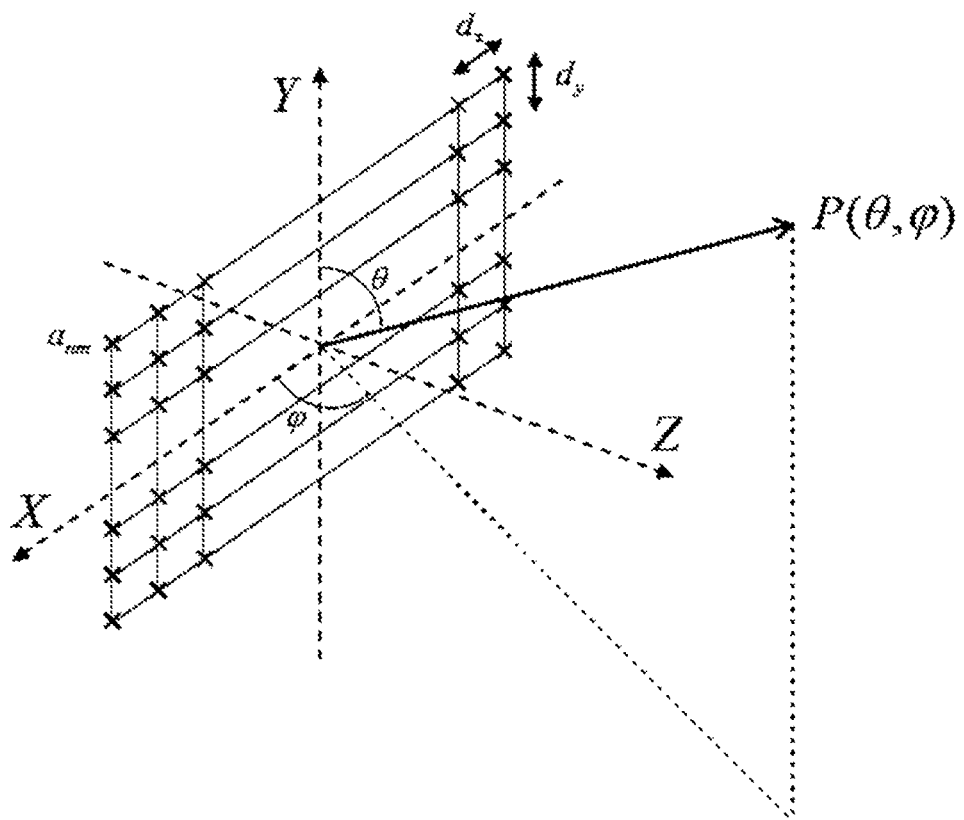
FIG. 3 is an antenna array configuration at the base station for applicability of the present invention.

FIG. 3 illustrates the antenna array configuration at the base station for applicability of the present invention. Without loss of generality, preferably it will be assumed that the antenna array is located in an XY plane; those skilled in the art will easily apply the results described here to any other coordinate axes. A number of $N_1 \times N_2$ identical antenna elements are arranged in a rectangular grid, with $N_1$ elements along the x axis and $N_2$ elements along the y axis, each of the elements having a defined radiation pattern as usually employed in cellular systems for sector coverage. The physical separation between antennas is denoted as $d_x$ along the X dimension and $d_y$ along the Y dimension. Each antenna element will be excited by a different signal $a_{nm}$ which in general will be a function of time and frequency.

The combined radiation pattern of the grid can be obtained by calculating the Array Factor according to the formula:

$$\vec{E}_{global}(t,\theta,\phi) = \vec{E}_{individual}(t,\theta,\phi) \cdot AF(\theta,\phi)$$

where $\vec{E}_{global}$ denotes the global far field obtained from the combination of all antenna elements, $\vec{E}_{individual}$ is the far field corresponding to each of the antenna elements, and $AF(\theta,\phi)$ represents the array factor which depends on the geometry and the excitation currents of the antenna elements.

The combined radiation characteristics can be controlled by the array factor which for the above configuration can be expressed as [6]:

$$AF(\theta, \varphi) = \sum_{n=0}^{N_1-1} \sum_{m=0}^{N_2-1} a_{nm} \exp\left(j\frac{2\pi d_x}{\lambda} n\sin(\theta)\cos(\varphi)\right) \exp\left(j\frac{2\pi d_y}{\lambda} m\sin(\theta)\sin(\varphi)\right),$$

where $\lambda$ is the wavelength given by the expression c/f, c is the speed of light and f is the central frequency of operation. It is to note that in FDD systems two different central frequencies are employed for downlink and uplink, however given the small percentage difference between them (usually less than 5%) the corresponding wavelengths are fundamentally equivalent. The above equation has the form of a Fourier transform of the sequence of excitation elements $a_{nm}$ (with a sign reversal), where the role of the time domain is played by the normalized dimensions x/λ and y/λ, and the role of the frequency domain is played by the angles θ,φ.

Changing the coordinates to so-called directional cosines for ease of notation:

$$u = \sin(\theta)\cos(\phi)$$

$$v = \sin(\theta)\sin(\phi),$$

the expression simplifies to $$AF(u, v) = \sum_{n=0}^{N_1-1} \sum_{m=0}^{N_2-1} a_{nm} \exp\left(j\frac{2\pi d_x}{\lambda} nu\right) \exp\left(j\frac{2\pi d_y}{\lambda} mv\right).$$

The physical angles (θ,φ) can be obtained from the variables u, v through the expressions:

$$\theta = \arcsin\sqrt{u^2 + v^2}$$

$$\varphi = \arccos\frac{u}{\sqrt{u^2 + v^2}}.$$

It is to note that u and v runs from −1 to +1, but not all values are physically realizable as the visible margins will comprise circumferences of radius equal to $\sin^2(\theta)$:

$$u^2 + v^2 = \sin^2(\theta).$$

Figure 4:
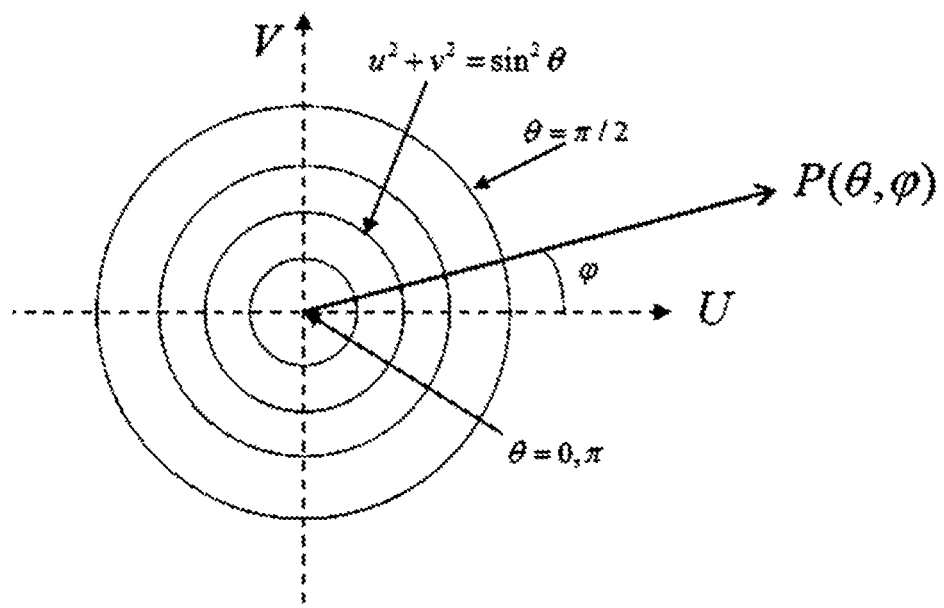
FIG. 4 is an illustration of a unit circle wherein depicting the visible margins which comprise the (u, v) values included within the circumference for each value of θ.

This concept is illustrated in FIG. 4, wherein the visible margins will comprise those (u, v) values included within the circumferences for each value of θ.

The above described array will have maximum radiation towards the z axis (θ=π/2). It is to note that the two-dimensional array may be placed in a plane not perpendicular to the Z direction, with a tilt angle aimed at covering the cell region more efficiently. This tilt can also be accomplished through electrical phasing in the vertical dimension[6], thus resulting in a direction of maximum radiation different than θ=π/2. However for the purpose of the present invention the array will be supposed to be perpendicular to the direction of maximum radiation, without loss of generality.

Although the Array Factor is a continuous function of the variables u and v, in this invention it is proposed to sample it in the (u, v) domain for suitable digital processing while attaining the fundamental characteristics of the radiation pattern.

The sampling periods in u and v are chosen such that the Nyquist sampling criterion is obeyed. The Nyquist criterion dictates that the sampling period in one domain must be at most equal to the inverse of the overall "length" in the other domain [4]. Sampling in the (u, v) domain will therefore require that the sampling periods be lower or equal than the inverse of the overall normalized dimensions in x and y:

$$\Delta u \le \frac{\lambda}{N_1 d_x}$$

$$\Delta v \le \frac{\lambda}{N_2 d_y},$$

with the discretized variables ($u_k$, $v_k$) being equal to:

$$u_k = k \cdot \Delta u$$

$$v_l = l \cdot \Delta v$$

Choosing the equalities we can write for the array factor:

$$AF(k, l) = \sum_{n=0}^{N_1-1} \sum_{m=0}^{N_2-1} a_{nm} \exp\left(j\frac{2\pi}{N_1} nk\right) \exp\left(j\frac{2\pi}{N_2} ml\right).$$

This has the form of a two-dimensional Inverse Discrete Fourier Transform (IDFT) of the sequence $a_{nm}$, except for a normalization constant:

$$AF(k, l) =$$

$$N_1 N_2 \cdot DFT^{-1}\{a[n, m]\} = \sum_{n=0}^{N_1-1} \sum_{m=0}^{N_2-1} a[n, m] \exp\left(j\frac{2\pi}{N_1} nk\right) \exp\left(j\frac{2\pi}{N_2} ml\right),$$

where the excitation elements are denoted as a[n,m] thus representing a discrete two-dimensional sequence. A Discrete Fourier Transform (DFT) allows for obtaining the excitations from the desired array factor, with a normalization constant $1/(N_1 N_2)$:

$$a[n, m] = \frac{1}{N_1 N_2} \sum_{k=0}^{N_1-1} \sum_{l=0}^{N_2-1} AF[k, l] \exp\left(-j\frac{2\pi}{N_1} nk\right) \exp\left(-j\frac{2\pi}{N_2} ml\right).$$

Therefore it is possible to apply a two-dimensional DFT of the desired array factor to obtain the excitations. Instead of the array factor, it is possible to think of a set of signals s[k,l] to be delivered to M users, given that their coordinates are known in terms of (u, v). The signals will comprise the information data aimed at the different users in both time and frequency domains, as usually scheduled by OFDM-based wireless systems.

Figure 5:
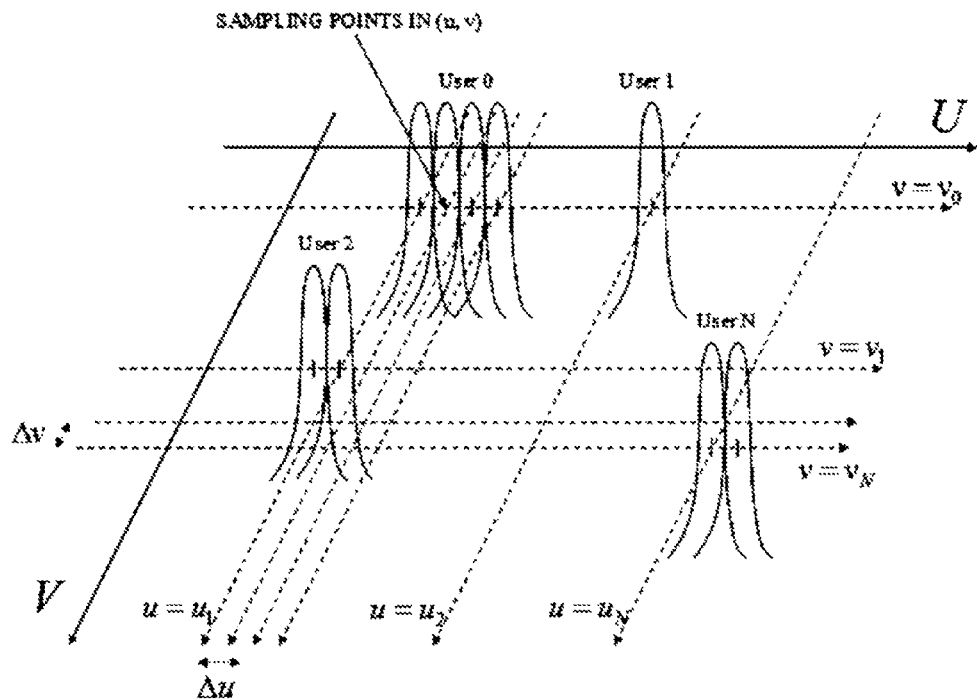
FIG. 5 is an illustration showing the reconstruction process for the array factor.

The reconstruction process for the array factor is graphically illustrated in FIG. 5. It highlights the fact that, given separations $d_x, d_y$ between antenna elements along the x and y directions respectively, it is possible to choose appropriate values of the sampling periods in u and v so that no interference appears between the different directions in space, as the peak of each beam coincides with the nulls of all the other beams. Conversely, given a sampling grid in (u, v) it is possible to choose the antenna elements spacing so that no inter-user interference appears.

It is to note that the full angular coverage of the antenna array in (u, v) is given by:

$$(\Delta u)_{tot} = N_1 \Delta u = \frac{\lambda}{d_x}$$

$$(\Delta v)_{tot} = N_2 \Delta v = \frac{\lambda}{d_y}.$$

The visible region will additionally comprise the (u, v) values inside the unit circle, as illustrated in FIG. 4.

Based on the previous disclosure, and assuming a two-dimensional antenna array with identical antenna elements at coordinate points $(nd_x, md_y)$, an Orthogonal Space-Frequency Division Multiplexing technique is proposed based on the following design principles:

Given a sector area to be covered by the antenna elements in the base station, a suitable grid in the (u, v) domain is defined so that the sector is completely covered by a set of discrete points given by:

$$u_k = k \cdot \Delta u; k = 0, 1, \ldots, N_1 - 1$$

$$v_l = l \cdot \Delta v; l = 0, 1, \ldots, N_2 - 1,$$

where the sampling periods $\Delta u, \Delta v$ represent the desired granularity for addressing the users. The visible region of this grid corresponds to those values enclosed within a unit circle, according to the equation:

$$u^2 + v^2 \leq 1.$$

Figure 6:
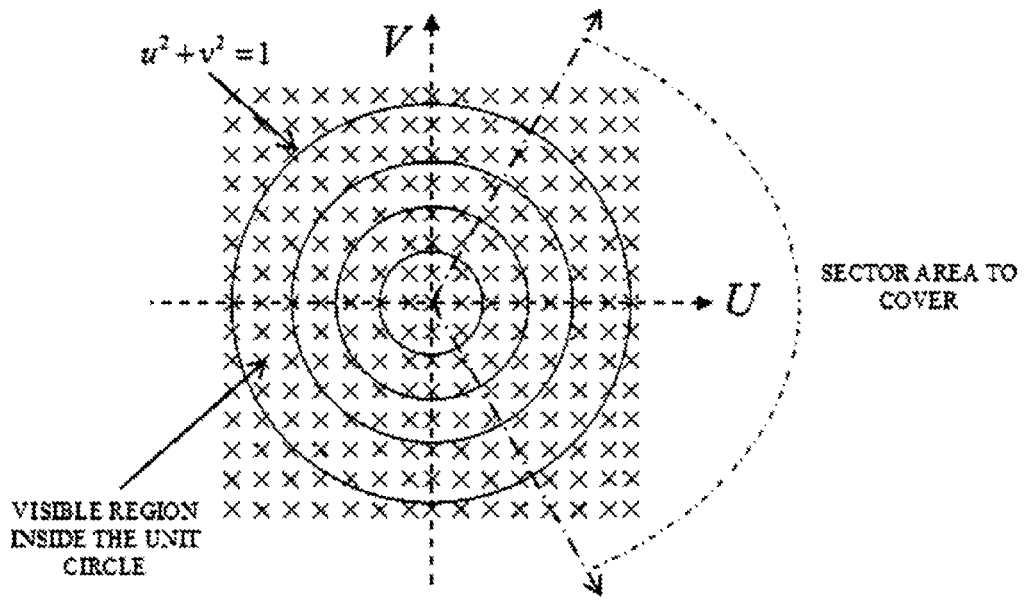
FIG. 6 is an illustration showing the area covered by the individual radiation pattern of the antenna. The grid points in (u, v) are represented by crosses and the useful region corresponds to those points inside the sector area that lie within the unit circle.

Additionally, only the area covered by the individual radiation pattern of the antenna elements will be of interest, as the total field outside will be considered null (and therefore no users will be served out of the maximum sector angle). This is illustrated in FIG. 6, where the grid points in (u, v) are represented by crosses and the useful region corresponds to those points inside the sector area that lie within the unit circle (oriented towards positive u values in FIG. 6).

The antenna spacing in both dimensions of the array (denoted as x, y but not precluding any other directions) will be chosen according to the following equations:

$$d_x = \frac{\lambda}{N_1 \Delta u}$$
$$d_y = \frac{\lambda}{N_2 \Delta v}.$$

This antenna spacing ensures orthogonal addressing of users in space given that their locations in (u, v) are given by suitable coordinates (k, l). The angular coverage of the array will be given by the values in the range $\Delta u, \Delta v$ inside the unit circle:

$$(\Delta u)_{tot} = \frac{\lambda}{d_x}$$
$$(\Delta v)_{tot} = \frac{\lambda}{d_y}.$$

This should be taken into account in the design of the array for appropriate coverage of the sector area.

Given a set of signals $S_i$ to be delivered to M users at specific locations, it is possible to construct a two-dimensional signal by taking the desired signal values at the users' locations, and nulls elsewhere:

$$S_T[k, l] = \begin{cases} S_i; \forall (k, l) = \{(k_i, l_i), i = 0, 1, \ldots, M-1\} \\ 0; \text{otherwise} \end{cases},$$

where $S_i$ denote the complex baseband signal aimed at user i, and $(k_i, l_i)$ are the user positions in (u, v).

The required excitations for the antenna elements a[n,m], where n and m are indices corresponding to the x and y dimensions in the array, can be obtained with the proposed technique through a two-dimensional DFT:

$$a[n, m] = \frac{1}{N_1 N_2} \sum_{k=0}^{N_1-1} \sum_{l=0}^{N_2-1} S_T[k, l] \exp\left(-j\frac{2\pi}{N_1}nk\right) \exp\left(-j\frac{2\pi}{N_2}ml\right),$$

$$\text{with } \begin{cases} n = 0, \ldots, N_1 - 1 \\ m = 0, \ldots, N_2 - 1 \end{cases}.$$

The above required excitation coefficients account only for an intended set of M signals at a given instant in time. Given that in OFDM each user is granted a number of parallel subcarriers over a number of temporal symbols, the procedure must be extended to include the frequency domain. The aim is to simultaneously deliver the signals contained in the subcarriers that comprise the whole system bandwidth to all the users. Denoting $N_c$ as the number of parallel subcarriers in the system bandwidth with indices $f=0, \ldots, N_c-1$, the desired signal is constructed as follows:

$$S_T[k, l, f] = \begin{cases} S_i[f]; \forall (k, l) = \{(k_i, l_i), i = 0, 1, \ldots, M-1\} \\ 0; \text{otherwise} \end{cases}.$$

The frequency contents corresponding to each user are the complex baseband signals denoted as $S_i[f]$.

The required excitations can be first calculated in the frequency domain, according to the proposed technique, by the equation:

$$a[n, m, f] = \frac{1}{N_1 N_2} \sum_{k=0}^{N_1-1} \sum_{l=0}^{N_2-1} S_T[k, l, f] \exp\left(-j\frac{2\pi}{N_1}nk\right) \exp\left(-j\frac{2\pi}{N_2}ml\right),$$

$$\text{with } \begin{cases} n = 0, \ldots, N_1 - 1 \\ m = 0, \ldots, N_2 - 1 \\ f = 0, \ldots, N_c - 1 \end{cases}$$

The above calculation must be performed over all the intended subcarriers; hence orthogonal space-frequency multiplexing is possible for simultaneously addressing the set of users in the available time-frequency resources.

In order to obtain the time-domain excitation coefficients to be applied over the set of antennas, suitable inverse DFTs enable reconstruction of the OFDM symbols (after suitable insertion of a cyclic prefix for multipath resilience). The time-domain OFDM transmit signal $A_T[n,m,t]$ with time indices $t=0, \ldots, N_c-1$, corresponding to each antenna element (n, m), will therefore be obtained from the following expression:

$$A_T[n, m, t] = \frac{1}{N_c} \sum_{f=0}^{N_c-1} a[n, m, f] \exp\left(j\frac{2\pi}{N_c}ft\right) = = \frac{1}{N_c N_1 N_2}$$

$$\sum_{f=0}^{N_c-1} \sum_{k=0}^{N_1-1} \sum_{l=0}^{N_2-1} S_T[k, l, f] \exp\left(j\frac{2\pi}{N_c}ft\right) \exp\left(-j\frac{2\pi}{N_1}nk\right) \exp\left(-j\frac{2\pi}{N_2}ml\right).$$

For the detection of uplink signals coming from the M terminals, an inverse procedure can be employed that determines the frequency contents of the signals at each of the relevant (u, v) sampling points. Having received the signals $A_R[n,m,t]$ from antenna elements (n, m) at time t, the frequency contents corresponding to each user can be obtained from the following expression:

$$S_R[k, l, f] = \sum_{t=0}^{N_c-1} \sum_{n=0}^{N_1-1} \sum_{m=0}^{N_2-1} A_R[n, m, t] \exp\left(-j\frac{2\pi}{N_c}ft\right) \exp\left(-j\frac{2\pi}{N_1}nk\right) \exp\left(-j\frac{2\pi}{N_2}ml\right).$$

Hence each of the uplink signals coming from the M users can be conveniently detected at the corresponding (u, v) points and scheduled frequencies. This allows for orthogonal resources allocation also in the uplink, provided that the Directions of Arrival (DoA) can be suitably estimated from uplink signal analysis.

The proposed method allows for obtaining suitable time-domain signals to be applied over a number of antennas, giving rise to orthogonal space-frequency multiplexing of users. It also provides the frequency contents of the signals transmitted in uplink with ideally no inter-user interference.

In the above proposed method of the present invention, preferably it is assumed that the users are perfectly located (and known) at positions given by a set of angles (θ,φ), and corresponding directional cosines (u, v), that coincide with a pre-defined grid. In practical conditions, however, the users will not be located precisely at those coordinates and some inter-beam interference will appear. In order to prevent this, a suitable joint scheduling strategy involving space and frequency resources can be exploited in such a way that inter-user interference is minimized, at the cost of introducing unused space-frequency resources that serve as guard beams. In massive MIMO systems comprising a large number of antennas this can be considered a minor drawback, as usually not all space-frequency resources will be exploited.

Figure 7:
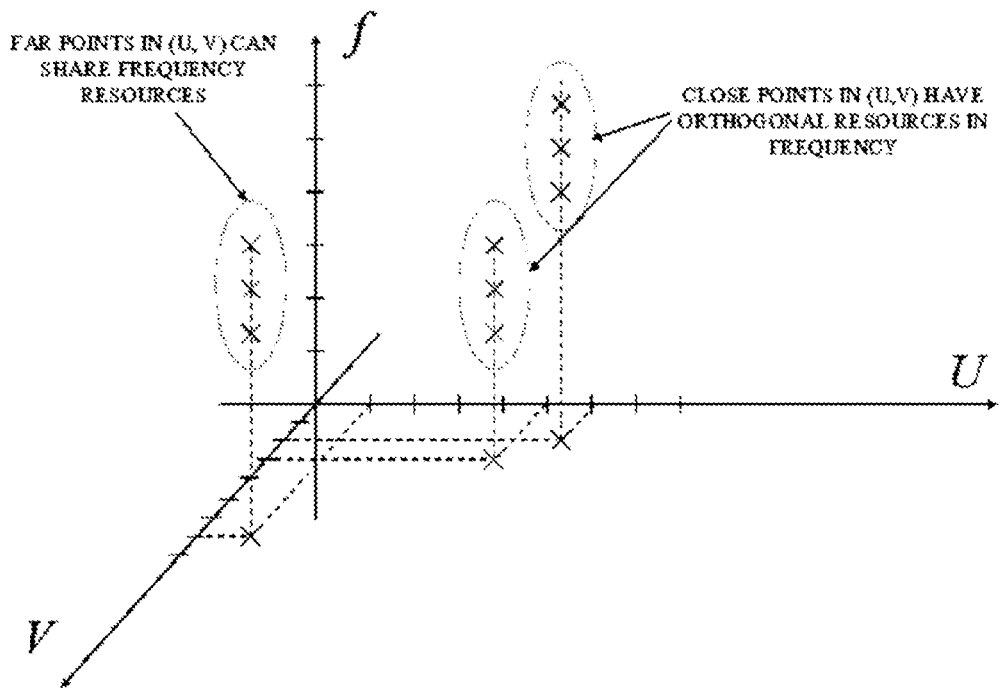
FIG. 7 illustrates the avoidance of inter-user interference by assigning orthogonal frequency resources to beams which are close to each other, according to an alternative embodiment of the present invention.

According to some alternative embodiment, and supposing that a given user is located at a point with coordinates $(u_0, v_0)$ for which the nearest point in the grid has coordinates (k, l), the sampling at points other than the centre of the beams results in inter-beam interference and therefore inter-user interference. To that end, four solutions are proposed to cope with it:

For instance, according to the first alternative, if there are several users whose (u, v) beams are close to each other, the scheduler in the base station can avoid inter-user interference by allocating different time-frequency resources to each of them. The degrees of freedom in assigning time, frequency and space resources in the present invention enables great flexibility for coping with undesired inter-user interference for user beams which are close in the (u, v) domain. FIG. 7 illustrates the avoidance of inter-user interference by assigning orthogonal frequency resources to beams which are close to each other. Adding the time dimension would require four-dimensional resource grids, hence it is illustrated only in the combined (u, v)-frequency domain.

Figure 8:
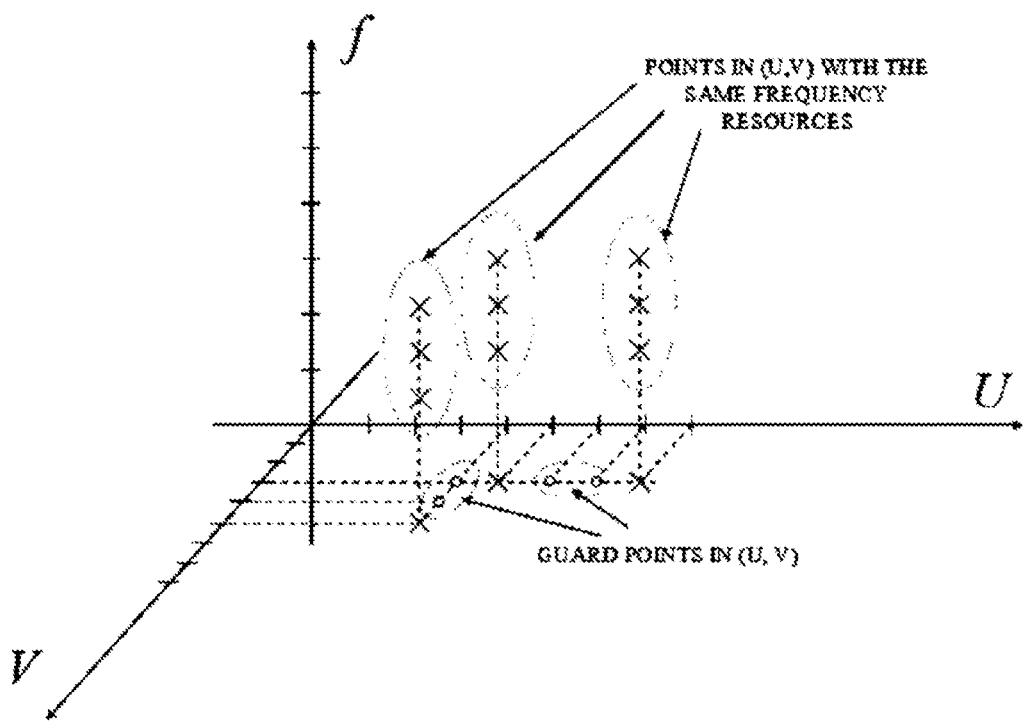
FIG. 8 illustrates the alternative embodiment where the scheduling strategy can be performed by reserving guard beams in the (u, v) domain at some of the grid points between the cell coordinates of two or more cell users.

According to the second alternative, given a large number of transmit antennas, it is also feasible to reserve suitable guard beams between the affected users to let the beam powers vanish over a number of grid points in the (u, v) domain. This assumes that the angle difference between the users to be addressed is much larger than the beam width associated with the (u, v) grid. The reconstruction formula in the (θ,φ) domain will comprise a set of sinc-shaped beams with a (1/x) decay profile (more exactly, Dirichlet-shaped [4]), which after a number of guard beams will result in negligible interference. In combination with flexible time-frequency allocations, it is possible to keep inter-user interference to a minimum, as illustrated in FIG. 8.

Figure 9:
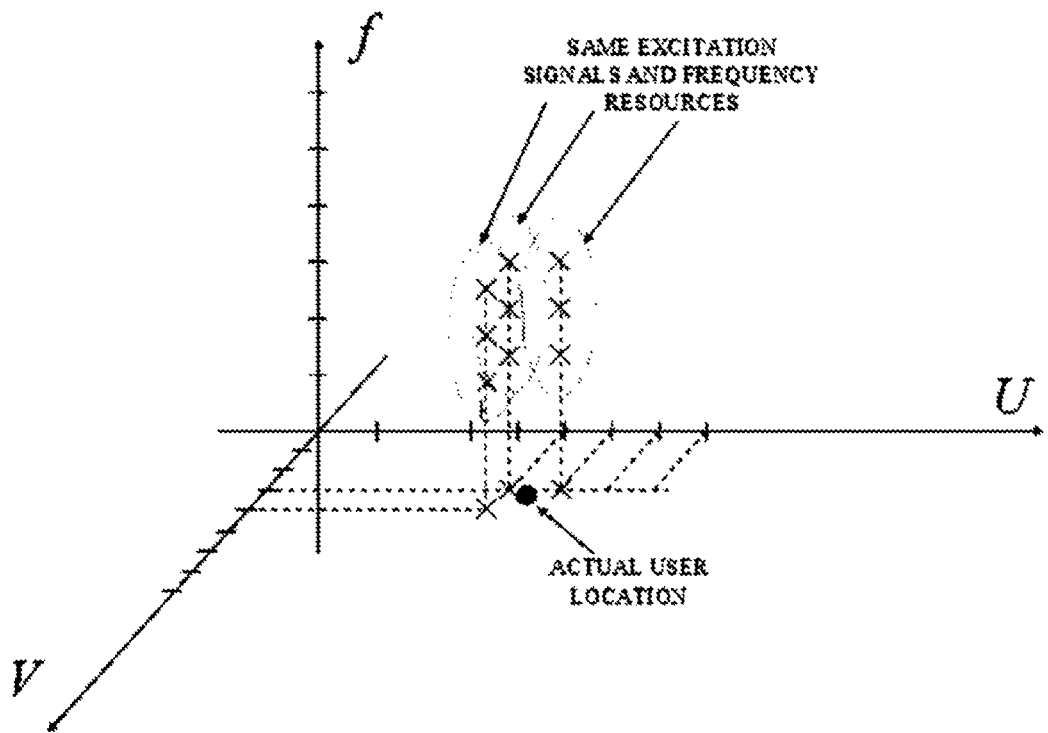
FIG. 9 illustrates the alternative embodiment wherein the scheduling strategy can be performed by assigning the same transmit signal to a plurality of grid points enclosing the cell user coordinates in the (u, v) domain and a number of guard beams for reduced interference in order to account inaccuracies when estimating the cell users' spherical angles (θ,φ).

According to the third alternative, it is also possible to assign the same desired signal to a set of grid points enclosing the intended user coordinates, in addition to a number of guard beams for reduced interference, in order to account for inaccuracies in the angle estimation. The received beam will essentially contain the desired symbol with no interference if the nearest beam intended for a different user is located several (u, v) points apart, with an attenuation and phase shift caused by sampling at a point other than the beam centre. As illustrated in FIG. 9, this attenuation and phase shift can be estimated at the receiver with the aid of suitable pilot subcarriers which will experience the same attenuation and phase shifts as the desired signals.

Figure 10:
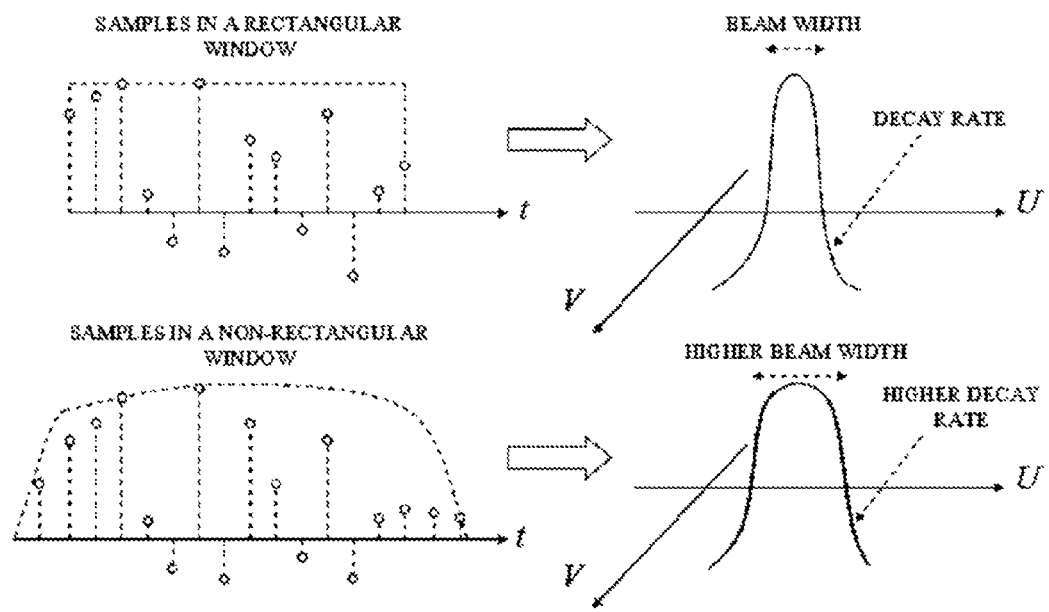
FIG. 10 illustrates the application of a generic windowing technique for alleviating inter-user interference and hence the need for guard beams according to an alternative embodiment of the present invention.

Additionally, according to the fourth alternative, it is possible to reduce inter-beam interference by modifying the shape of the beam reconstruction functions in order to increase the decay rate. Any windowing technique can be applied to the excitation coefficients for more accurate control of the beams' decay rate, without changing the orthogonality of the proposed method, at the cost of increasing the beam width [7]. FIG. 10 illustrates the application of a generic windowing technique for alleviating inter-user interference and hence the need for guard beams.

These four proposed alternatives solutions can be applied over the number of users having positions significantly offset from the theoretical grid points, and eventually over all the users in realistic conditions. Given a sufficient number of antenna elements, a combination of guard beams, flexible time-frequency allocations and control of the beams' decay rate can mitigate inter-user interference problems to a minimum. Other similar solutions can be applied for reduction of inter-user interference without significant departure from the present invention.

The physical arrangement of the antenna array determines the grid resolution in the (u, v) domain. In scenarios where the angular location of the users is not known with much accuracy, or where the users' mobility is significant, it can be useful, according to an embodiment, to dynamically adjust the grid in the (u, v) domain so as to maximize the illumination. This can be accomplished by considering only a subset of active antenna elements in the array, thus reducing the number of excited antenna elements $N'_1 < N_1$, $N'_2 < N_2$ and decreasing resolution $\Delta u', \Delta v'$:

$$\Delta u' = \frac{\lambda}{N'_1 d_x} > \Delta u$$
$$\Delta v' = \frac{\lambda}{N'_2 d_y} > \Delta v$$

In this way wider beam widths can be obtained in a dynamic way, at the cost of reducing resolution and therefore the number of simultaneously served users at a given time-frequency resource. As the spacing between antenna elements is unchanged, the angular coverage is also kept constant through the expressions:

$$(\Delta u)_{tot} = \frac{\lambda}{d_x}$$
$$(\Delta v)_{tot} = \frac{\lambda}{d_y},$$

although with a lower number of beams (each with a wider beam width). This can be useful for scenarios with a lower number of possibly moving users, where precise pointing is difficult and the system requires wider beams.

Figure 11:
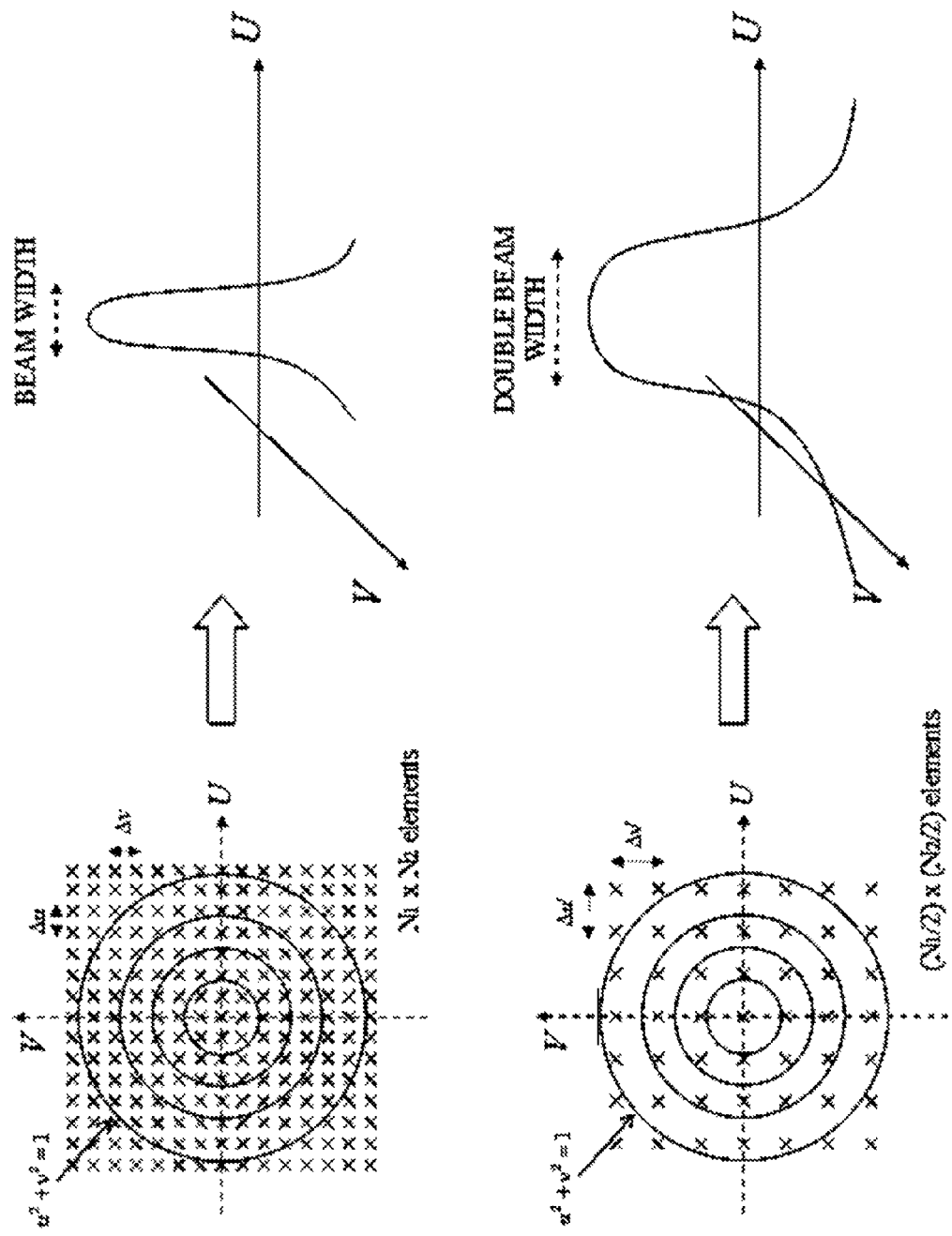
FIG. 11 illustrates the scenario where the number of active antenna elements is halved while keeping the same inter-antenna distance, which results in doubling the grid separation in the (u, v) domain and hence the beam width.

FIG. 11 illustrates the scenario where the number of active antenna elements is halved while keeping the same inter-antenna distance, which results in doubling the grid separation in the (u, v) domain and hence the beam width.

In addition to the principles introduced by the present invention, the effect of the individual antenna elements can be taken into account by properly multiplying the array factor by the individual pattern response:

$$\vec{E}_{global}(t,\theta\phi) = E_{individual}(t,\theta,\phi) \cdot AF(\theta,\phi),$$

The combined effect will therefore be a multiplication of the synthesized field by the individual antenna pattern. In wireless cellular systems this is advantageous as each base station is intended to cover a number of sectors (usually three), each sector comprising an azimuth angle spread $\Delta\phi$ of, say 120°. Hence the individual antennas can have the desired radiation pattern across $\phi$ so as to limit radiation outside the sector area.

The users will cope with the individual antenna radiation pattern in the same way as they do with channel impairments. Suitable pilot subcarriers interspersed with data allow for estimation of the channel amplitudes and phases. These pilots will include the effects of the individual antenna patterns as well as channel impairments, and therefore can be compensated at the receiver by means of any suitable equalization technique.

Figure 12:
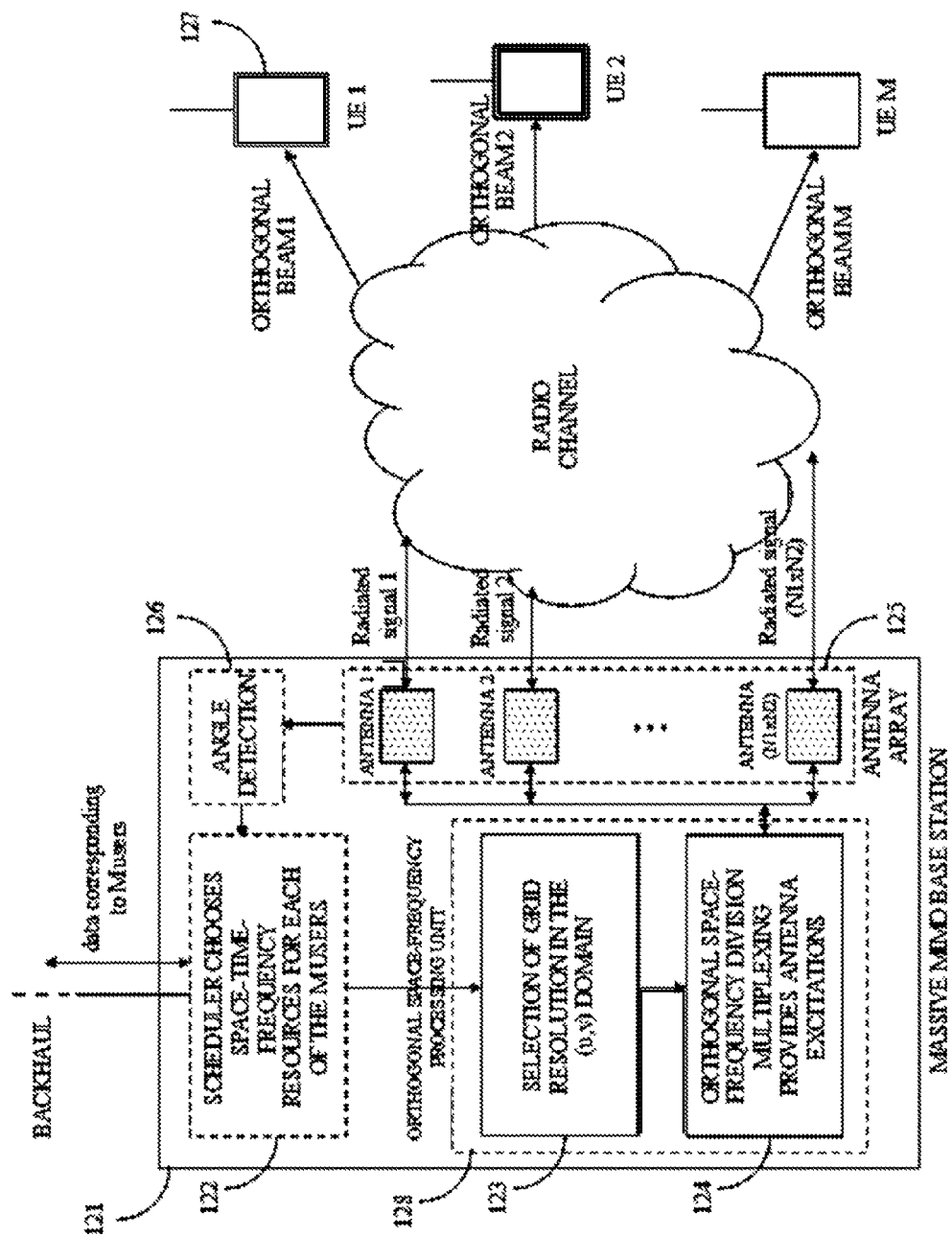
FIG. 12 is an illustration showing all the proposed blocks or elements according to an aspect of the present invention.

FIG. 12 shows a preferred embodiment for the present invention, where the new blocks proposed within the base station are illustrated in solid lines, in contrast to prior art blocks depicted in dashed lines. In accordance with the preferred embodiment, a massive-MIMO base station 121 in an OFDM wireless cellular system comprises a number (N1×N2) of antennas in a two-dimensional array, and M users in the cell are to be served simultaneously in certain time-frequency resources. The scheduler 122 assigns appropriate resources in time, frequency and space for each of the M users, where space resources correspond to different line-of-sight angles of vision. These angles are input to the scheduler as detected by block 126 through analysis of the transmitted signals in the uplink, which are received by the two-dimensional antenna array 125. The orthogonal space-frequency processing unit 128 performs the main procedures proposed in this invention, and comprises two blocks, 123 and 124. The sampling grid in the (u, v) domain is chosen by block 123 according to the desired angle resolution, in order to ensure orthogonality of the received beams, following the principles described in the present invention. The proposed orthogonal space-frequency division multiplexing technique provides the required excitations for the antenna elements in block 124, therefore giving rise to a set of (N1×N2) radiated signals. These signals are affected by the radio channel, after which a set of M orthogonal beams are received by M users in the cell (one of which is depicted as block 127). Each of the users will receive different signals in certain time-frequency resources by means of the M orthogonal beams, without experiencing any interference from the other beams, and with no need for tailoring the radiation patterns to each of the users.

It is also possible to generate instead a set of M' beams (with M'>M), or to excite a lower number of antennas N1', N2' in order to overcome any inaccuracies in the angle estimations, according to the principles stated in the present invention.

Additionally, the proposed orthogonal space-frequency multiplexing technique allows for obtaining the frequency contents of the signals transmitted by the M users in the uplink, with ideally no inter-user interference.

The proposed mechanism can be implemented as a collection of software elements, hardware elements, firmware elements, or any combinations of them.

Advantageously, the present invention introduces a new orthogonal multiplexing technique for OFDM wireless systems based on a large number of antennas at their base stations. By selecting appropriate values of the number of antennas and the inter-antenna distances, an orthogonal space-frequency multiplexing technique is proposed whereas multiple users can be addressed at the same time-frequency resources with no interference from the others, provided that the base station can discriminate their line-of-sight angles of vision. A discrete grid of space-frequency resources is introduced such that each user can receive a given set of subcarriers in the frequency domain and different radiated beams in the space domain, with no need to tailor the radiation patterns intended for each user. The proposed invention automatically delivers the intended signals to each of the users, with no inter-user interference, by means of DFT-like space-frequency processing that can be efficiently performed through FFTs.

Traditional beamforming schemes utilize a given number of antennas to conform the radiation pattern, thus enhancing radiation towards specific directions in space. The proposed invention does not deal with beamforming in a classical way, but devises a procedure to simultaneously address the intended users so that each point in space receives the required set of frequency resources, by making inter-user interference ideally zero. This scheme can exploit the multi-antenna concept to a maximum as orthogonal space-frequency multiplexing can get the most out of the antenna array, with a DFT-like processing that extends traditional OFDM techniques. Classical beamforming techniques synthesize different array patterns for each of the users, with significant inter-user interference from secondary lobes which, to be minimized, requires a large number of antennas per user. In contrast, the proposed invention seeks the antenna excitations so that precise signal values are obtained at the sampling points defined by the grid in the (u, v) space. This approach has the advantage of addressing as many users as antennas are at the base station.

In practical situations, where the user positions can present significant offsets from the ideal sampling grid points, several techniques can be applied for minimizing inter-user interference without departure from the proposed invention.

The scope of the invention is defined in the following set of accompanying claims.

REFERENCES

[1] 3GPP TS 36.300, Evolved Universal Terrestrial Radio Access (E-UTRA) and Evolved Universal Terrestrial Radio Access Network (E-UTRAN); Overall Description, Stage 2 (Release 8)
[2] http://www.3gpp.org/LTE-Advanced (May 2013)

[3] S. Sesia, I. Toufik, M. Baker (editors), "LTE, the UMTS Long Term Evolution: From Theory to Practice" (2$^{nd}$ edition), John Wiley & Sons, 2011
[4] A. V. Oppenheim and R. W. Schafer, "Discrete-Time Signal Processing", Prentice-Hall: Englewood Cliffs, N.J., 1989
[5] RP-121804, "New SID Proposal: Study on Full Dimension MIMO for LTE", 3GPP TSG RAN Meeting #58, Dec. 4-7, 2012
[6] C. A. Balanis, "Antenna Theory: Analysis and Design", 2$^{nd}$ edition, John Wiley & Sons, 1997
[7] Harris, Fredric J. (1978), "On the use of Windows for Harmonic Analysis with the Discrete Fourier Transform", Proceedings of the IEEE vol. 66 (1): 51-83
[8] F. Rusek et al (2013), Scaling up MIMO: Opportunities and Challenges with Very Large Arrays, IEEE Signal Proc. Magazine, vol. 30 (1): 40-60
[9] S. Moradi, R. Doostnejad and G. Gulak (2011), "Downlink Beamforming for FDD Systems with Precoding and Beam Steering", IEEE Global Telecommunications Conference (GLOBECOM 2011)

The invention claimed is:

1. A method for performing multiple access in wireless OFDM cellular systems considering both space and frequency domains, comprising at least one base station equipped with a large number of antennas according to a two-dimensional rectangular array and a number M of cell users, said rectangular array comprising $N_1$ antenna elements along one axis with a regular spacing $d_x$ and $N_2$ antenna elements along a perpendicular axis with a regular spacing $d_y$, said cell users being characterized by spherical angles $(\theta,\phi)$ in a spherical coordinate system, characterized in that in order to achieve orthogonal multiple access the method comprises using an orthogonal space-frequency processing unit for:
selecting a grid spacing $(\Delta u, \Delta v)$ in a $(u, v)$ domain through the equations:

$$\Delta u = \frac{\lambda}{N_1 d_x}$$
$$\Delta v = \frac{\lambda}{N_2 d_y},$$

where $\lambda$ denotes a wavelength of a system operating frequency, and the $(u, v)$ domain is obtained from the following transformation of the spherical angles $(\theta,\phi)$:

$$u = \sin(\theta)\cos(\phi)$$

$$v = \sin(\theta)\sin(\phi),$$

discretizing the $(u, v)$ domain according to the following expressions:

$$u_k = k \cdot \Delta u, k=0, 1, \ldots, N_1-1$$

$$v_l = l \cdot \Delta v, l=0, 1, \ldots, N_2-1,$$

where a visible region of a grid corresponds to values enclosed within a unit circle according to the equation:

$$u^2 + v_2 \leq 1;$$

constructing a set of signals $S_T[k,l,f]$ according to the following expression:

$$S_T[k, l, f] = \begin{cases} S_i[f]; \forall\, (k, l) = \{(k_i, l_i), i = 0, 1, \ldots, M-1\} \\ 0; \text{otherwise} \end{cases},$$

where $S_i[f]$ denote frequency contents of a complex baseband signal aimed at user i, and $(k_i, l_i)$ represent estimated user locations in the discretized $(u, v)$ grid;
calculating the time-domain excitations coefficients $A_T[n, m, t]$ for the antenna elements in the array given by coordinates $(nd_x, md_y)$, for generation of the downlink transmit signals according to the following expression:

$$A_T[n, m, t] = \frac{1}{N_c N_1 N_2}$$
$$\sum_{f=0}^{N_c-1} \sum_{k=0}^{N_1-1} \sum_{l=0}^{N_2-1} S_T[k, l, f] \exp\left(j\frac{2\pi}{N_c} ft\right) \exp\left(-j\frac{2\pi}{N_1} nk\right) \exp\left(-j\frac{2\pi}{N_2} ml\right),$$

where $N_c$ denotes the number of subcarriers in the system bandwidth; and
obtaining the frequency contents $S_R[k,l,f]$ of the complex baseband signals received from the M users in the uplink, by applying the following transformation over a set of received signals $A_R[n,m,t]$ corresponding to each of the antenna elements:

$$S_R[k, l, f] =$$
$$\sum_{t=0}^{N_c-1} \sum_{n=0}^{N_1-1} \sum_{m=0}^{N_2-1} A_R[n, m, t] \exp\left(-j\frac{2\pi}{N_c} ft\right) \exp\left(-j\frac{2\pi}{N_1} nk\right) \exp\left(-j\frac{2\pi}{N_2} ml\right).$$

2. A method according to claim 1, comprising further performing, by a combined space-frequency scheduler unit, a scheduling strategy by assigning unused space and/or frequency resources to each one of the M cell users in such a way that interferences between users' beams are minimized.

3. A method according to claim 2, wherein said scheduling strategy comprises assigning orthogonal time-frequency resources to beams which are close to each other to avoid said interferences between the users' beams.

4. A method according to claim 2, wherein said scheduling strategy comprises reserving guard beams in the $(u, v)$ domain at some of grid points between cell coordinates of two or more cell users, in order to keep said interferences between the users' beams to a minimum.

5. A method according to claim 2, wherein said scheduling strategy comprises assigning the same transmit signal to a plurality of grid points enclosing the cell user coordinates in the $(u, v)$ domain and a number of guard beams for reduced interference, to account inaccuracies when estimating the cell users' spherical angles $(\theta,\phi)$.

6. A method according to claim 2, wherein said scheduling strategy comprises modifying a shape of a beam reconstruction functions by applying a windowing technique to the excitation coefficients in order to control a beams' decay rate and hence alleviate interference between the users' beams.

7. A method according to claim 1, further comprising dynamically adjusting, by a grid resolution unit, a resolution of the grid in the $(u, v)$ domain according to a desired resolution angle by considering only a subset of active antenna elements in the array, and comprising maintaining the spacing between antenna elements and the angular coverage of the antenna array.

8. A system for performing multiple access in wireless OFDM cellular systems considering both space and frequency domains, comprising at least one base station (121) equipped with a large number of antennas according to a two-dimensional rectangular array (125) and a number M of cell users (127), said rectangular array (125) comprising $N_1$ antenna elements along one axis with a regular spacing $d_x$ and $N_2$ antenna elements along a perpendicular axis with a regular spacing $d_y$, said cell users (127) being characterized by suitable spherical angles ($\theta,\phi$) in a spherical coordinate system, characterized in that the system comprises an orthogonal space-frequency processing unit (128) to achieve orthogonal multiple access comprising:

selecting a grid spacing ($\Delta u, \Delta v$) in a (u, v) domain through the equations:

$$\Delta u = \frac{\lambda}{N_1 d_x}$$
$$\Delta v = \frac{\lambda}{N_2 d_y},$$

where $\lambda$ denotes the wavelength of the system operating frequency, and the (u, v) domain is obtained from the following transformation of the spherical angles ($\theta,\phi$):

$u = \sin(\theta)\cos(\phi)$ $v = \sin(\theta)\sin(\phi)$, discretizing the (u, v) domain according to the following expressions:

$u_k = k \cdot \Delta u, k=0,1,\ldots,N_1-1$ $v_l = l \cdot \Delta v, l=0,1,\ldots,N_2-1$, where a visible region of a grid corresponds to values enclosed within a unit circle according to the equation:

$u^2 + v^2 \leq 1$;

constructing a set of signals $S_T[k,l,f]$ according to the following expression:

$$S_T[k, l, f] = \begin{cases} S_i[f]; & \forall\, (k, l) = \{(k_i, l_i), i = 0, 1, \ldots, M-1\} \\ 0; & \text{otherwise} \end{cases},$$

where $S_i[f]$ denote frequency contents of a complex baseband signal aimed at user i, and $(k_i, l_i)$ represent estimated user locations in the discretized (u, v) grid;

calculating the time-domain excitations coefficients $A_T[n, m, t]$ for the antenna elements in the array given by coordinates $(nd_x, md_y)$, for generation of the downlink transmit signals according to the following expression:

$$A_T[n, m, t] = \frac{1}{N_c N_1 N_2}$$

$$\sum_{f=0}^{N_c-1} \sum_{k=0}^{N_1-1} \sum_{l=0}^{N_2-1} S_T[k, l, f] \exp\left(j\frac{2\pi}{N_c}ft\right) \exp\left(-j\frac{2\pi}{N_1}nk\right) \exp\left(-j\frac{2\pi}{N_2}ml\right),$$

where $N_c$ denotes the number of subcarriers in the system bandwidth; and obtaining the frequency contents $S_R[k,l,f]$ of the complex baseband signals received from the M users in the uplink, by applying the following transformation over a set of received signals $A_R[n,m,t]$ corresponding to each of the antenna elements:

$$S_R[k, l, f] =$$

$$\sum_{t=0}^{N_c-1} \sum_{n=0}^{N_1-1} \sum_{m=0}^{N_2-1} A_R[n, m, t] \exp\left(-j\frac{2\pi}{N_c}ft\right) \exp\left(j\frac{2\pi}{N_1}nk\right) \exp\left(j\frac{2\pi}{N_2}ml\right).$$

9. A system according to claim 8, further comprising a combined space-frequency scheduler unit (122) to perform space-frequency resource allocation strategies for each one of the M cell users (127).

10. A system according to claim 9, wherein an angle detection unit (126) related to said combined space-frequency scheduler unit (122) is prepared for analyzing the signals received from said two-dimensional rectangular array (125) in order to estimate angles of arrival of said received signals.

11. A system according to claim 8, further comprising a grid resolution unit (123) to adjust resolution of grid in the (u, v) domain according to a desired resolution angle by considering only a subset of active antenna elements in the array, in order to ensure orthogonality of a plurality of beams while maintaining the spacing between antenna elements and angular coverage of the antenna array.

\* \* \* \* \*